US011927336B1

(12) United States Patent
Shao

(10) Patent No.: US 11,927,336 B1
(45) Date of Patent: Mar. 12, 2024

(54) FRESCO LAMP CAPABLE OF BEING FREELY PLUGGED WITH LEDS AND ELECTRIFIED

(71) Applicant: Jianmin Shao, Taizhou (CN)

(72) Inventor: Jianmin Shao, Taizhou (CN)

(73) Assignee: Jianmin Shao, Taizhou (CN)

( * ) Notice: Subject to any disclaimer, the term of this patent is extended or adjusted under 35 U.S.C. 154(b) by 0 days.

(21) Appl. No.: 18/358,194

(22) Filed: Jul. 25, 2023

(51) Int. Cl.
*F21V 33/00* (2006.01)
*F21Y 115/10* (2016.01)

(52) U.S. Cl.
CPC ....... *F21V 33/0032* (2013.01); *F21Y 2115/10* (2016.08)

(58) Field of Classification Search
CPC ......................... A47G 1/0622; F21V 33/0032; F21Y 2115/10
See application file for complete search history.

(56) References Cited

U.S. PATENT DOCUMENTS 6,430,858 B1 * 8/2002 Andre .................. A47G 1/0622 40/550

FOREIGN PATENT DOCUMENTS

CN 210118666 U 2/2020
CN 211780679 U 10/2020
CN 217332690 U 8/2022

* cited by examiner

*Primary Examiner* — Jason M Han
(74) *Attorney, Agent, or Firm* — Nitin Kaushik

(57) ABSTRACT

The present disclosure discloses a fresco lamp capable of being freely plugged with light-emitting diodes (LEDs) and electrified, and aims to provide a fresco lamp with freely pluggable LEDs. The key point of the technical solution is as follows. After the LEDs are plugged into the fresco, the LEDs are electrically connected to an electrification unit below the fresco to form a closed circuit, and the LEDs are lightened. Each of the LEDs can be plugged to any position on the fresco and independently connected to the electrification unit, so that the LEDs are convenient to mount. The LEDs are connected in parallel with each other, so that the fresco lamp is convenient to overhaul. The fresco lamp is applicable to the field of lamps and lighting.

8 Claims, 1 Drawing Sheet

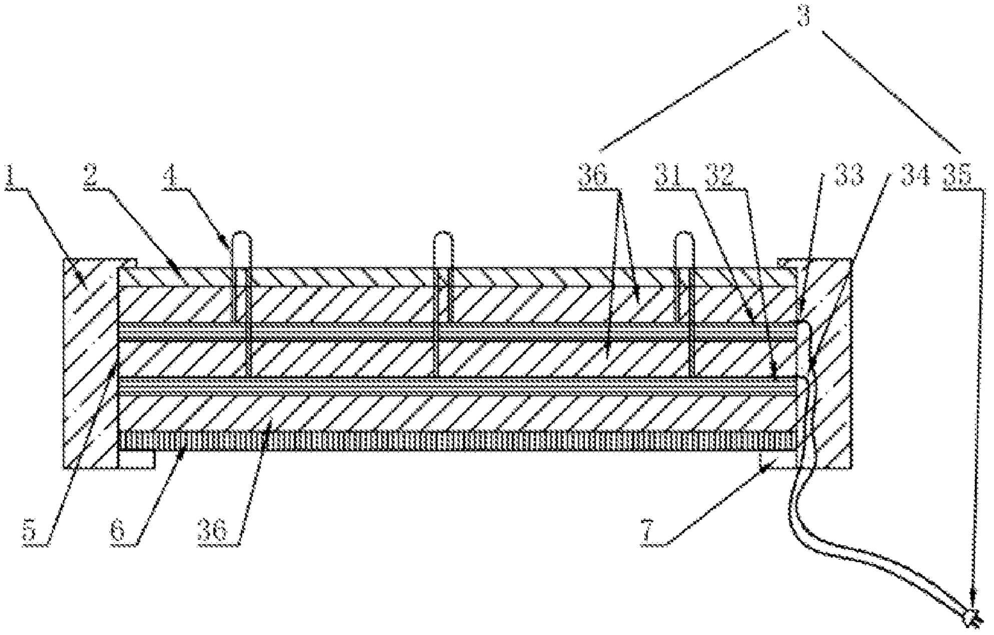
3
1
2
4
36
31
32
33
34
35
5
6
36
7

FRESCO LAMP CAPABLE OF BEING FREELY PLUGGED WITH LEDS AND ELECTRIFIED

TECHNICAL FIELD

The present disclosure relates to a lamp, more particularly, to a fresco lamp capable of being freely plugged with light-emitting diodes (LEDs) and electrified.

BACKGROUND

A fresco lamp is a lighting and decorative appliance. At present, the fresco lamp on the market mainly includes a fresco and light-emitting diodes (LEDs) mounted on the fresco. Although such a fresco lamp can play a role in lighting and decoration, the LEDs and the fresco are fixedly connected and non-removable. To mount the LEDs, the LEDs need to be aligned with mounting holes reserved in the fresco, and the LEDs are connected in series with each other, so that it is highly difficult in troubleshooting if a circuit is faulted, and problems of inconvenient mounting and high repair difficulty are caused.

SUMMARY

For the disadvantages in the prior art, the present disclosure aims to provide a fresco lamp capable of being freely plugged with light-emitting diodes (LEDs) and electrified.

In order to achieve the above objective, the present disclosure provides the following technical solution: A fresco lamp capable of being freely plugged with LEDs and electrified includes a fresco body, wherein the fresco body includes a picture frame, a fresco arranged in the picture frame, an electrification unit arranged in the picture frame and located below the fresco, and several LEDs capable of being freely plugged onto the fresco; the electrification unit is configured to form a closed circuit after two pins of the LEDs are plugged, so the LEDs are lightened; and the electrification unit is configured to form an open circuit after the two pins of the LEDs are unplugged, so the LEDs are not lightened.

By the adoption of the above technical solution, after the LEDs are plugged into the fresco, the LEDs are electrically connected to the electrification unit below the fresco to form a closed circuit, and the LEDs are lightened. Each of the LEDs can be plugged to any position on the fresco and independently connected to the electrification unit, so that the LEDs are convenient to mount. The LEDs are connected in parallel with each other, so that the fresco lamp is convenient to overhaul.

In a further setting of the preset disclosure, the electrification unit includes a conductive sheet A electrically connected to a positive electrode wire, a conductive sheet B connected to a negative electrode wire, and an adapter plug connected to the positive electrode wire and the negative electrode wire; the conductive sheet A and the conductive sheet B are spaced apart; and the two pins of the LEDs are electrically connected to the conductive sheet A and the conductive sheet B respectively after being plugged. The electrification unit further includes barrier pieces arranged between the fresco and the conductive sheet A as well as between the conductive sheet A and the conductive sheet B. A thickness of the barrier piece between the fresco and the conductive sheet A is less than a thickness of the barrier piece between the conductive sheet A and the conductive sheet B; and a thickness ratio is 0.25 to 1. Each conductive sheet is made of a copper material, and each barrier piece is made of a sponge material. A limiting ring slot for limiting the barrier pieces is also formed in a side wall of the picture frame.

By the adoption of the above technical solution, the two pins of the LEDs are electrically connected to the conductive sheet A and the conductive sheet B respectively through the barrier pieces, so that the connection is stable, and a short circuit will not be caused. The conductive sheets are made of the copper material, so that the conductivity is good. The barrier pieces made of the sponge material are arranged between the fresco and the conductive sheet A as well as between the conductive sheet A and the conductive sheet B, so that it is easy to plug the LEDs, and the insulation property is good. The material is soft, facilitating connection to the limiting ring slot on the picture frame. When the LEDs are plugged, the fresco and the conductive sheet A are resisted to be prevented from excessively moving.

In a further setting of the present disclosure, a separation plate and a barrier piece arranged between the separation plate and the conductive sheet B are further arranged in the picture frame. A bending member used for fixing the separation plate is arranged on the picture frame; the bending member fixes the separation plate after being bent; and the separation plate can be removed after the bending member is reset.

By the adoption of the above technical solution, the separation plate can effectively prevent the fresco, the conductive sheets, and the barrier pieces in the picture frame from falling off. The separation plate is detachably connected to the picture frame through the bending member, so that the separation plate is stably connected and convenient to mount and remove.

BRIEF DESCRIPTION OF DRAWINGS

The FIGURE is a sectional view of a fresco lamp capable of being freely plugged with LEDs and electrified according to the present disclosure.

Reference numerals in the drawings: 1: picture frame; 2: fresco; 3: electrification unit; 4: LED; 5: limiting ring slot; 6: separation plate; 7: bending member; 31: conductive sheet A; 32: conductive sheet B; 33: positive electrode wire; 34: negative electrode wire; 35: adapter plug; and 36: barrier piece.

DETAILED DESCRIPTION OF THE EMBODIMENTS

With reference to the FIGURE, an embodiment of a fresco lamp capable of being freely plugged with LEDs 4 and electrified of the present disclosure will be further described.

For ease of explanation, spatial relative terms such as "above", "below", "left", and "right" are used in the embodiments to explain a relationship between one component or feature shown in the figures and another component or feature. It should be understood that in addition to the orientations shown in the figures, spatial terms mean including different orientations of a device in use or operation. For example, if the device in the figures is placed upside down, a component described as being located "below" other components or features will be positioned "above" other components or features. Therefore, the exemplary term "below" can include both up and down orientations. The device can be positioned in other ways (rotated by 90 degrees or located at other orientations), and the spatial relative terms used here can be explained correspondingly.

Furthermore, relational terms such as "first" and "second" are used merely to distinguish one component from another component having the same name, instead of necessarily requiring or implying that these components have any of these actual relationships or orders.

A fresco lamp capable of being freely plugged with LEDs and electrified includes a fresco body. The fresco body includes a picture frame 1, a fresco 2 arranged in the picture frame 1, an electrification unit 3 arranged in the picture frame 1 and located below the fresco 2, and several LEDs 4 capable of being freely plugged onto the fresco 2. The electrification unit 3 is configured to form a closed circuit after two pins of the LEDs 4 are plugged, so the LEDs 4 are lightened; and the electrification unit 3 is configured to form an open circuit after the two pins of the LEDs 4 are unplugged, so the LEDs 4 are not lightened. The LEDs 4 can be plugged to any position on the fresco 2. A user can adjust positions and quantity of the LEDs 4 according to an actual need. A separation plate 6 is further arranged in the picture frame 1. A bending member 7 used for fixing the separation plate 6 is arranged on the picture frame 1. The bending member 7 fixes the separation plate 6 after being bent. The separation plate 6 can be removed after the bending member 7 is reset. The separation plate 6 is detachably connected to the picture frame 1, so that the fresco body is convenient to remove and mount.

The electrification unit 3 includes a conductive sheet A 31 electrically connected to a positive electrode wire 33, a conductive sheet B 32 connected to a negative electrode wire 34, and an adapter plug 35 connected to the positive electrode wire 33 and the negative electrode wire 34. The conductive sheet A 31 and the conductive sheet B 32 are spaced apart. Each conductive sheet is made of a copper material, so that the conductivity is good. The two pins of the LEDs 4 are electrically connected to the conductive sheet A 31 and the conductive sheet B 32 respectively after being plugged. The LEDs 4 are convenient to mount. The barrier pieces 36 made of the sponge material are arranged between the fresco 2 and the conductive sheet A 31, between the conductive sheet A 31 and the conductive sheet B 32, and between the conductive sheet B 32 and the separation plate 6, so that the insulation property is good, and a short circuit can be effectively prevented. The sponge material is soft, facilitating plugging of the LEDs 4. When the LEDs 4 are plugged, the fresco 2, the conductive sheet A 31, and the conductive sheet B 32 are resisted to be prevented from excessively moving. A thickness of the barrier piece 36 between the fresco 2 and the conductive sheet A 31 is less than a thickness of the barrier piece 36 between the conductive sheet A 31 and the conductive sheet B 32; and a thickness ratio is between 0.25 and 1. The ratio can effectively prevent a short circuit caused by simultaneously connecting the LEDs 4 to the conductive sheet A 31 and the conductive sheet B 32, so that the safety is high.

The above embodiments are only preferred embodiments of the present disclosure are not intended to limit the present disclosure. Usual changes and substitutions made by those skilled in the art within the scope of the technical solution of the present disclosure all fall within the protection scope of the present disclosure.

What is claimed is:

1. A fresco lamp capable of being freely plugged with light-emitting diodes (LEDs) and electrified, comprising a fresco body, wherein the fresco body comprises a picture frame (1), a fresco (2) arranged in the picture frame (1), an electrification unit (3) arranged in the picture frame (1) and located below the fresco (2), and several LEDs (4) capable of being freely plugged onto the fresco (2); the electrification unit (3) is configured to form a closed circuit after two pins of the LEDs (4) are plugged, so the LEDs (4) are lit; and the electrification unit (3) is configured to form an open circuit after the two pins of the LEDs (4) are unplugged, so the LEDs (4) are not lit.

2. The fresco lamp capable of being freely plugged with the LEDs and electrified according to claim 1, wherein the electrification unit (3) comprises a conductive sheet A (31) electrically connected to a positive electrode wire (33), a conductive sheet B (32) connected to a negative electrode wire (34), and an adapter plug (35) connected to the positive electrode wire (33) and the negative electrode wire (34); the conductive sheet A (31) and the conductive sheet B (32) are spaced apart; and the two pins of the LEDs (4) are electrically connected to the conductive sheet A (31) and the conductive sheet B (32) respectively after being plugged.

3. The fresco lamp capable of being freely plugged with the LEDs and electrified according to claim 2, wherein the electrification unit (3) further comprises barrier pieces (36) arranged between the fresco (2) and the conductive sheet A (31) as well as between the conductive sheet A (31) and the conductive sheet B (32).

4. The fresco lamp capable of being freely plugged with the LEDs and electrified according to claim 3, wherein a thickness of the barrier piece (36) between the fresco (2) and the conductive sheet A (31) is less than a thickness of the barrier piece (36) between the conductive sheet A (31) and the conductive sheet B (32); and a thickness ratio is 0.25 to 1.

5. The fresco lamp capable of being freely plugged with the LEDs and electrified according to claim 3, wherein a limiting ring slot (5) for limiting the barrier pieces (36) is formed in a side wall of the picture frame (1).

6. The fresco lamp capable of being freely plugged with the LEDs and electrified according to claim 3, wherein each conductive sheet is made of a copper material, and each barrier piece (36) is made of a sponge material.

7. The fresco lamp capable of being freely plugged with the LEDs and electrified according to claim 1, wherein a separation plate (6) and a barrier piece (36) arranged between the separation plate (6) and the conductive sheet B (32) are further arranged in the picture frame (1).

8. The fresco lamp capable of being freely plugged with the LEDs and electrified according to claim 7, wherein a bending member (7) used for fixing the separation plate (6) is arranged on the picture frame (1); the bending member (7) fixes the separation plate (6) after being bent; and the separation plate (6) is removed after the bending member (7) is reset.

* * * * *